United States Patent
Nelson et al.

(10) Patent No.: US 9,811,087 B2
(45) Date of Patent: Nov. 7, 2017

(54) METHOD FOR CONTROLLING A VEHICLE AND A VEHICLE GUIDANCE SYSTEM

(71) Applicant: Deere & Company, Moline, IL (US)

(72) Inventors: Frederick W. Nelson, Waukee, IA (US); Timothy A. Wilcox, Cissna Park, IL (US); Peter W. Kasap, Earlham, IA (US)

(73) Assignee: Deere & Company, Moline, IL (US)

( * ) Notice: Subject to any disclaimer, the term of this patent is extended or adjusted under 35 U.S.C. 154(b) by 694 days.

(21) Appl. No.: 13/894,498

(22) Filed: May 15, 2013

(65) Prior Publication Data

US 2014/0343782 A1     Nov. 20, 2014

(51) Int. Cl.
  *G01C 22/00* (2006.01)
  *G05D 1/02* (2006.01)
  *B60W 30/00* (2006.01)

(52) U.S. Cl.
  CPC .......... *G05D 1/0212* (2013.01); *B60W 30/00* (2013.01); *G05D 1/0221* (2013.01)

(58) Field of Classification Search
  USPC ............................ 701/50, 26, 33.8, 522, 69
  See application file for complete search history.

(56) References Cited

U.S. PATENT DOCUMENTS

| | | | |
|---|---|---|---|
| 3,781,783 A | 12/1973 | Tucker | |
| 5,097,423 A * | 3/1992 | Badinger | G01B 7/287 33/556 |
| 5,218,290 A | 6/1993 | Beckert et al. | |
| 5,414,618 A | 5/1995 | Mock et al. | |
| 5,899,950 A * | 5/1999 | Milender | G05B 19/0426 318/568.13 |
| 5,991,694 A | 11/1999 | Gudat et al. | |
| 6,112,114 A | 8/2000 | Dreher | |
| 6,549,849 B2 * | 4/2003 | Lange | G01C 21/00 342/357.31 |
| 6,636,296 B1 * | 10/2003 | Faulkner | G01C 3/22 33/277 |
| 6,681,551 B1 | 1/2004 | Sheidler et al. | |
| 6,990,399 B2 | 1/2006 | Hrazdera et al. | |
| 7,191,061 B2 * | 3/2007 | McKay | A01B 69/008 701/23 |

(Continued)

OTHER PUBLICATIONS

VMB8PBU 8 Channel Pushbutton Module. Product Brochure [online]. Velbus, 2011 [retrieved Jun. 2013]. Retrived from the internet: <http://www.velleman.eu/downloads/0/velbus/manuals/long_version/vmb8pbu_uk.pdf>.

(Continued)

*Primary Examiner* — Redhwan k Mawari
(74) *Attorney, Agent, or Firm* — Yee & Associates, P.C.

(57) ABSTRACT

A method or system for controlling a vehicle comprises entering a programming mode or a guidance mode based on user input to a switch. The user can enter a guidance program in accordance with a predetermined sequence of inputs of the switch by the user, where readiness for each successive input is indicated by a light source. A guidance mode is managed for guiding a vehicle in accordance with the entered guidance program. An encoder or sensor can sense a steering angle of a steering system. The steering angle is controlled in accordance with the guidance program if the system or the data processor is operating in a guidance mode.

19 Claims, 7 Drawing Sheets

(56) References Cited

U.S. PATENT DOCUMENTS

| | | | |
|---|---|---|---|
| 8,180,051 B1* | 5/2012 | O'Toole, Jr. | G06F 21/556 341/22 |
| 2004/0193349 A1 | 9/2004 | Flann et al. | |
| 2004/0193363 A1* | 9/2004 | Schmidt | A01B 69/007 701/23 |
| 2008/0257569 A1 | 10/2008 | Foster et al. | |
| 2009/0059728 A1* | 3/2009 | Potash | G07C 1/10 368/10 |
| 2009/0102984 A1* | 4/2009 | Arling | H04N 5/44 348/734 |
| 2009/0141910 A1* | 6/2009 | Mercs | H04S 1/00 381/119 |
| 2009/0207013 A1* | 8/2009 | Ayed | G08B 13/1427 340/539.1 |
| 2010/0185366 A1* | 7/2010 | Heiniger | A01B 69/008 701/50 |
| 2010/0256871 A1 | 10/2010 | Mitchell | |
| 2010/0309102 A1* | 12/2010 | Jung | G02F 1/133308 345/82 |
| 2011/0046836 A1 | 2/2011 | Anderson | |

OTHER PUBLICATIONS

International Search Report and the Written Opinion of the International Searching Authority issued in counterpart application No. PCT/US2014/037641, dated Oct. 10, 2014 (8 pages).

International Search Report and the Written Opinion of the International Searching Authority issued in counterpart application No. PCT/US2014/037643, dated Oct. 10, 2014 (8 pages).

* cited by examiner

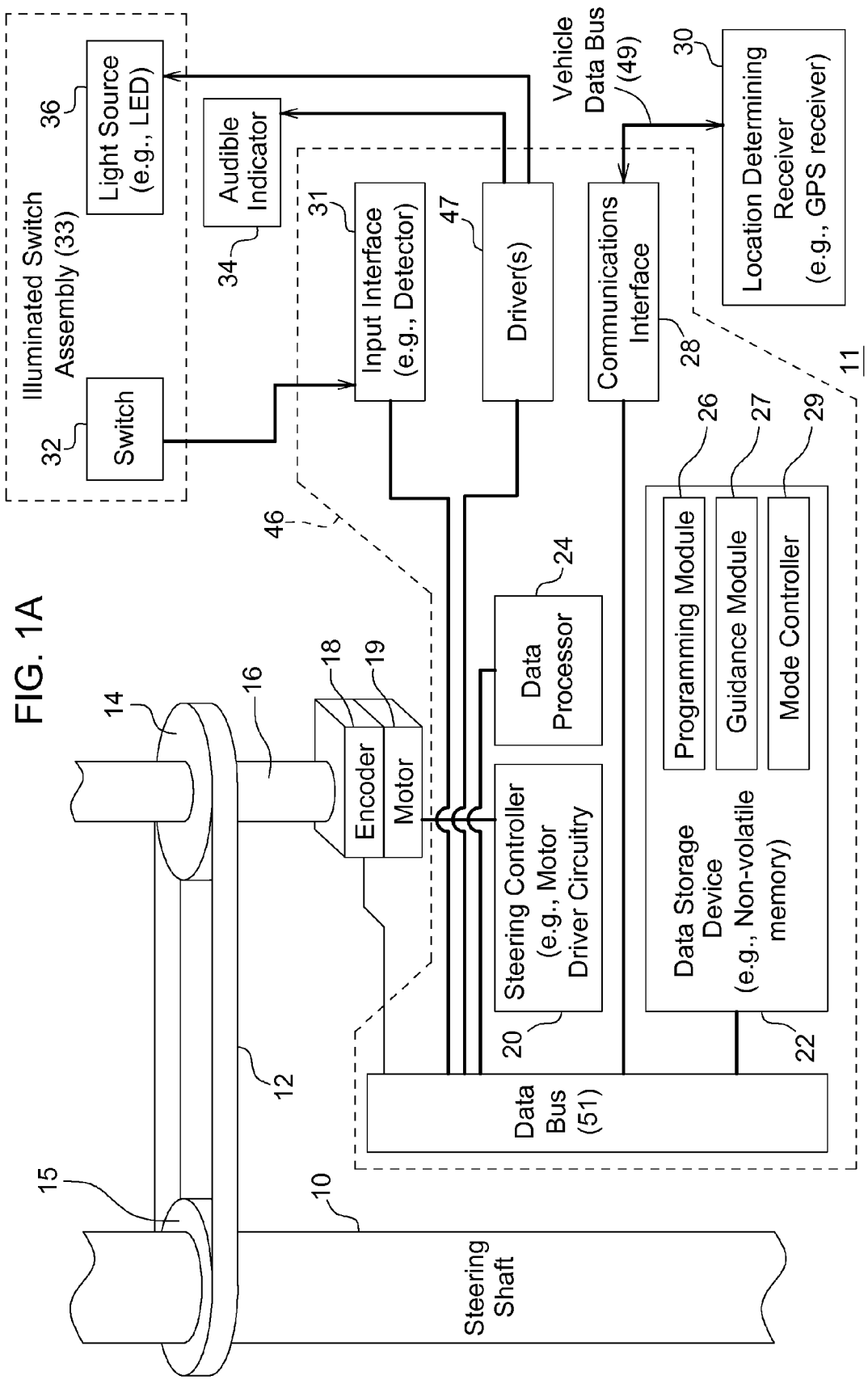

METHOD FOR CONTROLLING A VEHICLE AND A VEHICLE GUIDANCE SYSTEM

FIELD OF THE INVENTION

This disclosure relates to a method for controlling a vehicle and a vehicle guidance system.

BACKGROUND

In certain prior art, a robust display (e.g., liquid crystal display) can be designed for environmental conditions associated with operation on an off-road vehicle with or without a cab or enclosure for an operator. The robust display may be used to support or provide a user interface for a vehicle guidance system. However, the cost associated with the display may fall outside the desired sales price range for a vehicle operator or owner; particularly in developing markets.

Thus, there is a need to provide a method and system for controlling a vehicle without the expense of a robust display; particularly for controlling off-road vehicle guidance.

SUMMARY

In accordance with one embodiment, a method or system for controlling a vehicle comprises entering a programming mode or a guidance mode based on user input to a switch. The user can enter or establish a guidance program in accordance with a predetermined sequence of inputs of the switch by the user, where readiness for each successive input is indicated by a light source. A guidance mode is managed for guiding a vehicle in accordance with the entered guidance program. An encoder or sensor can sense a steering angle of a steering system. The steering angle is controlled in accordance with the guidance program if the system or the data processor is operating in a guidance mode.

BRIEF DESCRIPTION OF THE DRAWINGS

FIG. 1A is block diagram of one embodiment of a system for controlling a vehicle or a vehicle guidance system.

DESCRIPTION OF THE PREFERRED EMBODIMENT

Figure 1B:
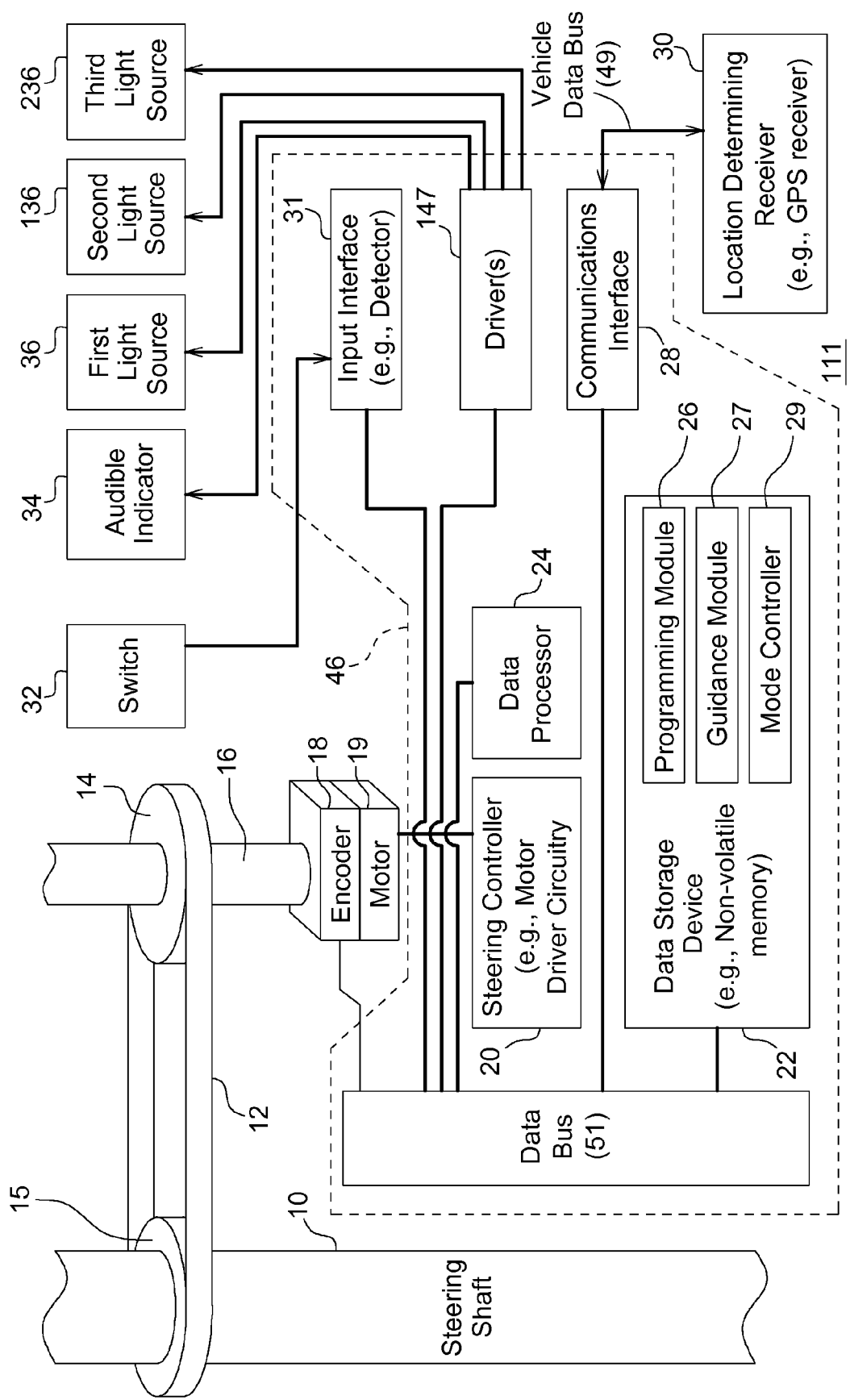
FIG. 1B is block diagram of another embodiment of a system for controlling a vehicle or a vehicle guidance system.

In accordance with one embodiment, FIG. 1A illustrates a system 11 for controlling a vehicle or a vehicle guidance system. A location-determining receiver 30 is coupled to a data processing system 46 via a vehicle data bus 49 or a data port of the data processing system 46. The data processing system 46 comprises an electronic data processor 24, a data storage device 22, a communications interface 28, one or more drivers 47 and an input interface 31 coupled to a data bus 51. As illustrated in FIG. 1A, a steering controller 20 (e.g., motor driver circuitry) and an encoder 18 are coupled to the data bus 51, although other configurations are possible where the steering controller 20 and encoder 18 are coupled to a data port of the data processing system 46. In one embodiment, the data processor 24 may communicate with one or more of the following devices via the data bus 51: data storage device 22, a communications interface 28, one or more drivers 47, an input interface 31, a steering controller 20, an encoder 18 and a location-determining receiver 30.

The data storage device 22 may store program instructions or one or more software modules, such as a programming module 26, a guidance module 27 and a mode controller 29.

The steering controller 20 is coupled to the motor 19, which in turn drives a motor shaft 16. The motor shaft 16 has a first pulley 14 or first gear. The steering shaft 10 has a second pulley 15 or second gear. In one embodiment, the motor 19 shaft 16 is mechanically coupled to the steering shaft 10 via a belt, chain, flexible member, or another mechanical coupling 12 that engages the first pulley 14 and the second pulley 15, or that engages the first gear and the second gear. In an alternate embodiment, the belt, chain or other mechanical coupling 12 is omitted, and the first pulley 14 and the second pulley 15 (e.g., each with cylindrical elastomeric engaging wear surfaces), or the first gear and the second gear engage each other, consistent with transferring rotational movement between the gears or pulleys.

The input interface 31 is coupled or electrically connected to a switch 32 or a switch assembly 33. One or more drivers 47 are coupled to or electrically connected to a light source 36 (e.g., a light emitting diode) and an audible indicator 34.

In one embodiment, the electronic data processing system 46 may be implemented by a general purpose computer that is programmed with software modules stored in the data storage device 22.

The electronic data processor 24 may comprise a microprocessor, a microcontroller, a central processing unit, a programmable logic array, an application specific integrated circuit (ASIC), a logic circuit, an arithmetic logic unit, or another data processing system for processing, storing, retrieving, or manipulating electronic data.

The data storage device 22 comprises electronic memory, nonvolatile random access memory, an optical storage device, a magnetic storage device, or another device for storing and accessing electronic data on any recordable, rewritable, or readable electronic, optical, or magnetic storage medium.

The communications interface 28 may comprise a transceiver, an input/output device, a data port, or other device for communicating, transmitting, or receiving data via the vehicle data bus 49.

A switch 32 comprises a user interface, push button switch, a single pole double throw switch, a contact switch, a spring-loaded switch, a momentary contact switch that is normally open, a switch assembly 33 with a switch 32 and light source 36 (e.g., light emitting diode), or another switch for inputting data to the data processor 24 or the data processing system 46. If a light source 36 is incorporated or integrated into the switch assembly 33, the switch assembly 33 can be used for outputting data (e.g., to signal or provide status messages to a user) as indicated by the data processor 24 or data processing system 46.

The audible indicator 34 comprises a beeper, an audible tone generator, a buzzer, an audible alert, or another device for providing an audible sound to an operator of the vehicle.

The light source 36 may comprise a light bulb, a fluorescent light assembly (e.g., a light bulb and electronic ballast), an incandescent light bulb, a light emitting diode, a light-emitting diode with a control or driver circuit, a segmented numeric display, an alphanumeric display, or another device for emitting a visual indicator detectable by an operator.

The location-determining receiver 30 may comprise a Global Positioning Receiver (GPS) or any satellite navigation receiver for providing position data, heading data, motion data, acceleration data, velocity data, or speed data for a vehicle. For example, the location-determining receiver 30 may comprise a satellite navigation receiver with a secondary receiver or transceiver for receiving a differential correction signal to correct errors or enhance the accuracy of position data derived from received satellite signals.

The encoder 18 comprises an encoder 18 or shaft position sensor for estimating a position, direction of rotation, angular position of a motor 19 shaft 16 or the steering shaft 10. For example, the encoder 18 may comprise a magnet mounted or secured to the shaft 16, a magnetic field sensor (e.g., Hall effect sensor) spatially separated from the magnet, and an electronic circuit for sensing the shaft rotational speed and/or rotational direction based on the detectable changes in the magnetic field. As illustrated in FIG. 1A, the motor 19 drives a motor shaft 16, which in turns drives the steering shaft 10 to steer the vehicle in accordance with commands provided by the steering controller 20 and the data processor 24 based on the data (e.g., command data and position data) from one or more of the following: the location-determining receiver, the programming module 26, the guidance module 27 and the mode controller 29.

In one embodiment, the system for controlling guidance of the vehicle operates as follows. The mode controller 29 enters a programming mode or a guidance mode based on user input to the switch 32. A detector or input interface 31 can identify a longer duration activation versus a shorter duration activation of the switch 32. For example, the input interface 31 may comprise a detector and a timer for measuring a duration of the pressing of the switch 32 by a user or operator of the vehicle. The duration of the pressing of the switch 32 may be the duration of the contact closure for a normally open switch or the duration of the contact open for a normally closed switch. If the input interface 31 (e.g., detector) determines that the pressing of the switch 32 is less than a threshold duration, the input interface 31 identifies a shorter duration activation (e.g., shorter switch activation) of the switch 32. However, if the input interface 31 (e.g., detector) determines that the pressing of the switch 32 is greater than or equal to the threshold duration, the input interface 31 identifies a longer duration activation (e.g., longer switch activation) of the switch 32. The entry of user input into the switch determines the operational mode of the data processing system 46, where the operational mode can include a programming mode or an guidance mode (e.g., execution mode). For example, if a user or vehicle operator presses the switch 32 for the longer duration, the mode controller 29 enters the data processing system 46 into the programming mode.

A programming module 26 is adapted to manage a programming mode in which the user enters, programs or establishes a guidance program in accordance with a predetermined sequence of inputs of the switch 32 by the user. In one example, the readiness for each successive or next input to the switch 32 is indicated by activation (e.g., illumination, blinking or signaling) of a light source 36 or one or more light sources. In another example, the readiness for each successive input is indicated by activation of a light source 36 and an audible indicator 34. In an alternative embodiment, the readiness of each successive input to the switch 32 is indicated by activation of an audible indictor 34 or the generation of an audible state message (e.g., recorded human voice message) or generated tone.

A guidance module 27 is adapted to manage a guidance mode for guiding a vehicle in accordance with the entered guidance program, which was previously entered in the programming mode. For example, if a user or vehicle operator presses the switch 32 for the shorter duration, the mode controller 29 enters the data processing system 46 into the guidance mode and the vehicle may initiate automatic steering of the vehicle by the data processing system 46, until or unless an operator turns the steering wheel (as detected by the encoder 18 or a torque detector) or activates a braking system of the vehicle. However, if no guidance program has been entered or established by a user, the data processing system 46 may illuminate the light 36 or energize an audible indicator 34 to provide an alert, code, signal or data message to a user that no guidance program has been entered or is available.

In one configuration, a data processor 24 executes software instructions associated with the mode controller 29, the programming module 26, and the guidance module 27. The data storage device 22 stores the software instructions for execution by the data processor 24. A steering system or its steering shaft 10 is associated with one or more wheels or tracks of the vehicle. An encoder 18 is capable of sensing a steering angle of a steering system or its steering shaft 10. A steering controller 20 (e.g., motor driver circuitry) associated with the steering system (or its steering shaft 10) can control the steering angle in accordance with the guidance program if the system or the data processor 24 is operating in a guidance mode.

In a programming mode, the electronic data processing system 46 can operate as follows. First, in the programming mode, the predetermined sequence comprises a user entering first point of a linear segment planned path for the vehicle (e.g., by pressing the switch 32 for the longer duration activation) after the light source 36 blinks once and while the vehicle is at the first point. The first point is associated with corresponding geographic coordinates (e.g., in two or three dimensions) at the time (e.g., first time) the switch 32 is pressed and released for a longer duration activation.

Second, in the programming mode, the predetermined sequence comprises a user entering second point of a linear segment planned path for the vehicle (e.g., by pressing the switch 32 for the longer duration activation) after the light source 36 successively blinks twice and while the vehicle is at the second point. The second point is associated with corresponding geographic coordinates (e.g., in two or three dimensions) at the time (e.g., second time) the switch 32 is pressed and released for a longer duration activation.

Third, in the programming mode, the predetermined sequence comprises a user entering a width between adjacent planned paths of the vehicle point of a linear path plan for the vehicle (e.g., by pressing the switch 32 for the longer duration activation) after the light source 36 successively blinks thrice and while the vehicle is at a width spaced apart between adjacent planned paths. The third point is associated with corresponding geographic coordinates (e.g., in two or three dimensions) at the time (e.g., third time) the switch is pressed and released for a longer duration activation.

In the guidance mode, as illustrated in FIG. 1A, an electric motor 19 is coupled to a steering shaft 10 of the steering system for directing the vehicle. The electric motor 19 can rotate the shaft 16 in either direction (clockwise or counter-clockwise) to achieve a target steering angle, a heading, wheel heading, or yaw angle of the vehicle in accordance with the programmed guidance program. Further, the data processing system 46 controls the motor 19 to turn the steering system or steering of the vehicle path to track the substantially linear vehicle path that interconnects the first point and the second point, and optionally to space a next vehicle path from the initial vehicle path based on the third point (e.g., distance between the third point and the initial, substantially linear vehicle path).

The 111 system of FIG. 1B is similar to the 11 system of FIG. 1A, except the 111 system of FIG. 1B comprises a plurality of light sources (36, 136, 236) and one or more drivers 147 coupled to the light sources (36, 136, 236) and a data port associated with the data processor 24 or electronic data processing system 46. In particular, FIG. 1B shows a first light source 36, a second light source 136, and a third light source 236 that are individually controllable or individually activated by one or more drivers 147 to provide a visual indication or status indication to a user or operator of the vehicle. For example, the first light source 36, the second light source 136, and the third light source 236 can indicate eight possible states or codes by the available combinations or permutations of the off states and on states for each light source. Like reference numbers in FIG. 1A and FIG. 1B indicate like elements.

The system (11, or 111) of FIG. 1A or FIG. 1B operates as follows. First, in the programming mode, the predetermined sequence comprises a user entering first point of a generally linear segment of a planned path for the vehicle (e.g., by pressing the switch 32 for the longer duration activation) after one of three indicator lights is lit (e.g., or blinks, strobes or flashes) and while the vehicle is at the first point. The first point (e.g., A point) is associated with corresponding geographic coordinates (e.g., in two or three dimensions) at the time (e.g., second time) the switch 32 is pressed and released for a longer duration activation.

Second, in the programming mode, the predetermined sequence comprises a user entering second point of a linear segment planned path for the vehicle (e.g., by pressing the switch 32 for the longer duration activation) after two of three indicator lights is lit (e.g., or blink, strobe or flash) and while the vehicle is at the second point. The second point (e.g., B point) is associated with corresponding geographic coordinates (e.g., in two or three dimensions) at the time (e.g., second time) the switch 32 is pressed and released for a longer duration activation.

Third, in the programming mode, the predetermined sequence comprises a user entering a width between adjacent planned paths of the vehicle point of a linear path plan for the vehicle (e.g., by pressing the switch 32 for the longer duration activation) after three indicator lights are lit (e.g., or blink, strobe or flash) and while the vehicle is at a width spaced apart between adjacent planned paths. The third point is associated with corresponding geographic coordinates (e.g., in two or three dimensions) at the time (e.g., second time) the switch 32 is pressed and released for a longer duration activation.

Figure 1C:
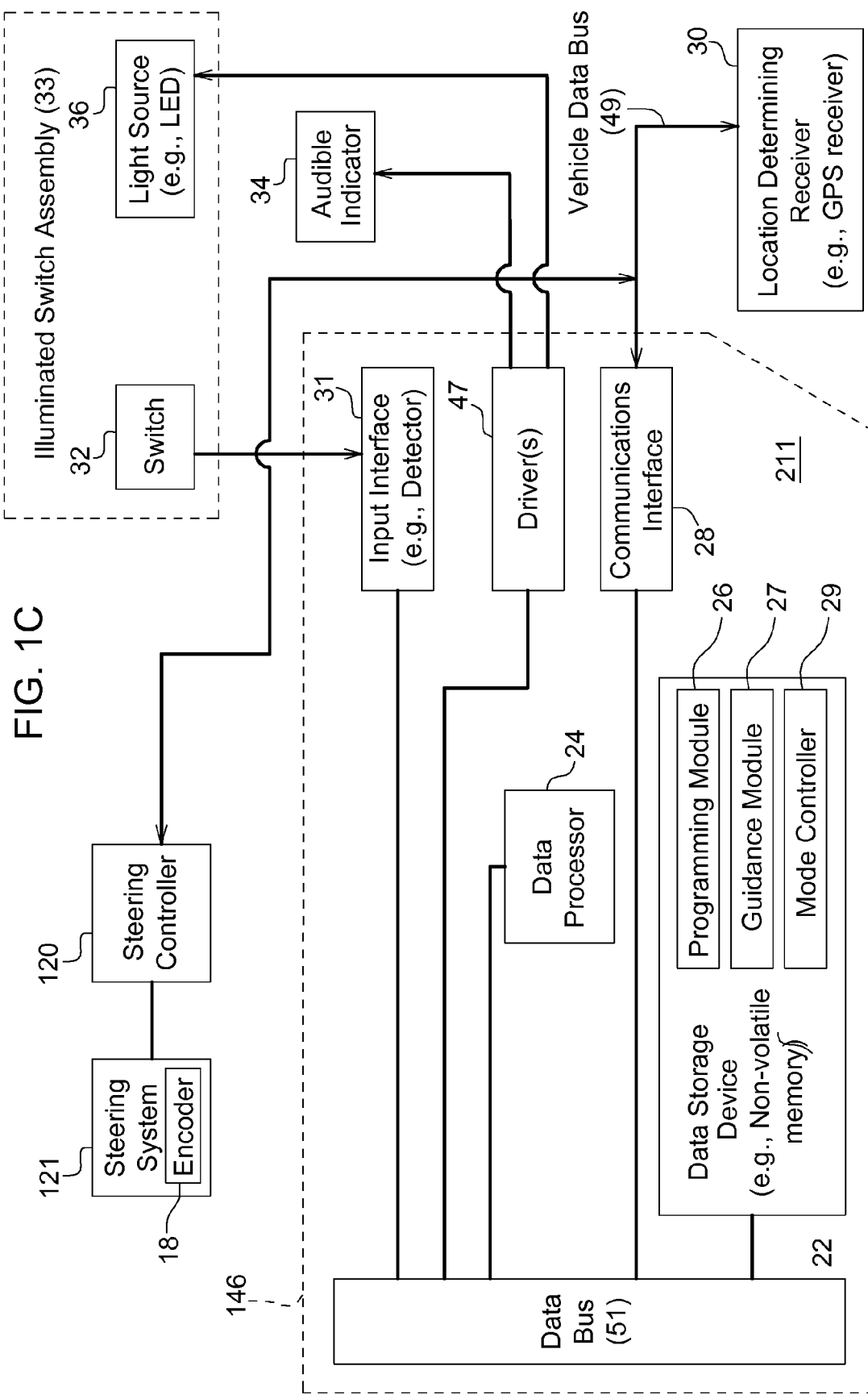
FIG. 1C is block diagram of another embodiment of a system for controlling a vehicle or a vehicle guidance system.

The system 211 of FIG. 1C is similar to the system 11 of FIG. 1A, except the system of FIG. 1C replaces the steering shaft 10, pulleys, mechanical coupling 12, motor shaft 16, motor 19 and steering controller 20 with a combination of steering controller 120 and a steering system 121. As illustrated, the steering system 121 comprises an encoder 18 or sensor for estimating a position of the steering shaft (e.g., similar to steering shaft 10), a heading, a steering angle, or yaw angle. Like references in FIG. 1A and FIG. 1C indicate like elements.

In FIG. 1C, the steering controller 120 is coupled to the vehicle data bus 49. The electronic data processing system 146 communicates with the steering controller 20 over the vehicle data bus 49, for example. The electronic data processing system 146 or its guidance module 27 sends steering commands or data messages to the steering controller 120. In turn, the steering controller 120 sends data messages or signals to the steering system 121 to control or steer the wheels via an electro-hydraulic valve, or another steering mechanism.

Figure 2:
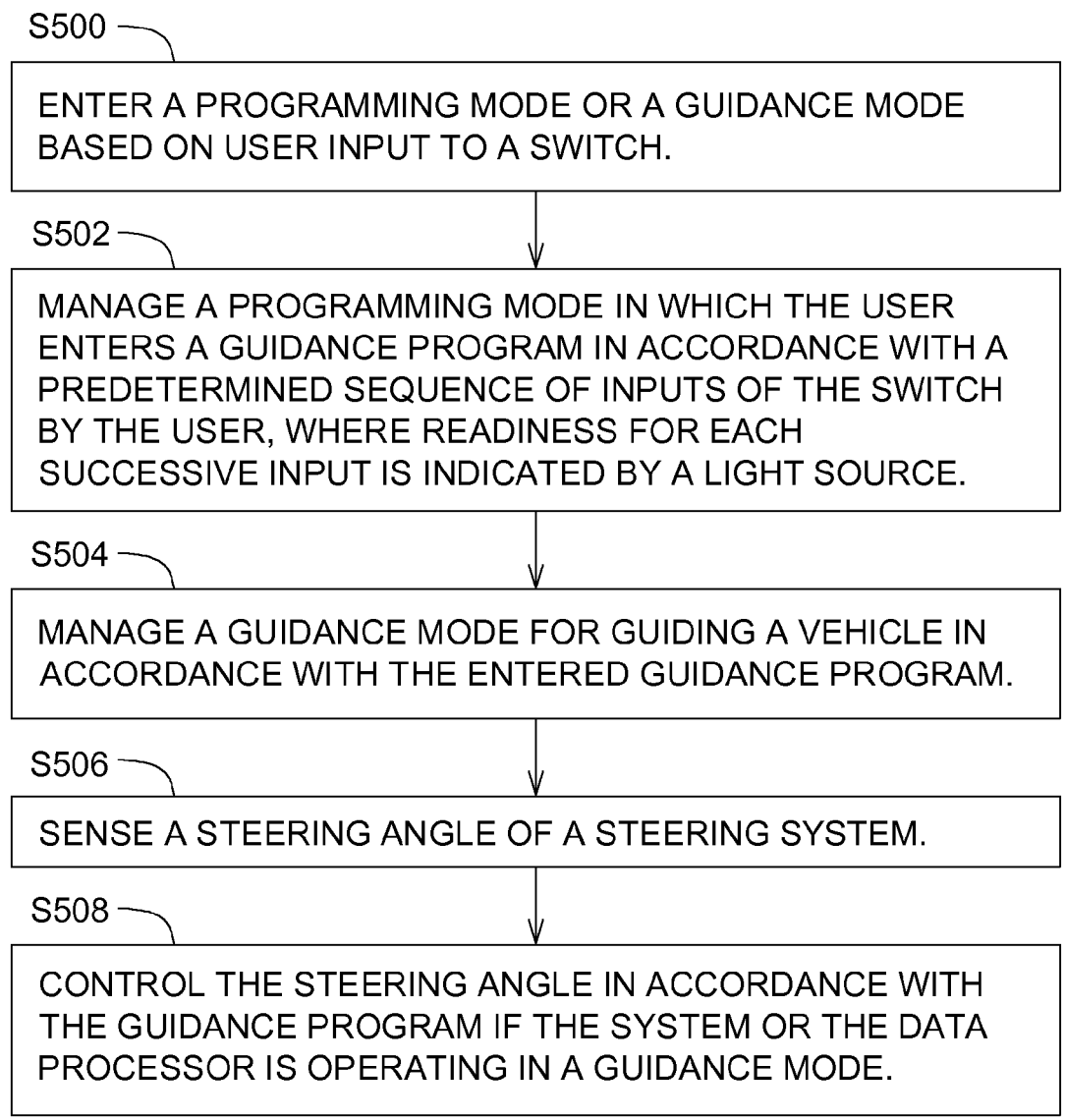
FIG. 2 is a flow chart of an embodiment of a method for controlling a vehicle.

FIG. 2 shows a method for controlling a vehicle in accordance with the system of FIG. 1A, 1B, or FIG. 1C, for instance. The method of FIG. 2 begins in step S500.

In step S500, a mode controller 29 or electronic data processing system (46 or 146) enters a programming mode or a guidance mode based on user input to a switch 32. A detector or input interface 31 can identify longer duration activation versus a shorter duration activation of the switch 32. For example, the input interface 31 may comprise a detector and a timer for measuring a duration of the pressing of the switch 32 by a user or operator of the vehicle. If the input interface 31 (e.g., detector) determines that the pressing of the switch 32 is less than a threshold duration, the input interface 31 identifies a shorter duration activation of the switch 32. However, if the input interface 31 (e.g., detector) determines that the pressing of the switch 32 is greater than or equal to the threshold duration, the input interface 31 identifies a longer duration activation of the switch 32. The initial entry into the switch 32, such as input of the shorter duration activation or longer duration activation, determines the operational mode of the data processing system 46, where the operational mode can include a programming mode or an guidance mode (e.g., execution mode). For example, if a user or vehicle operator presses the switch 32 for the longer duration, the mode controller 29 enters the data processing system (46 or 146) into the programming mode.

In step S502, the programming module 26 or the electronic data processing system (46 or 146) manages a programming mode in which the user enters, programs or establishes a guidance program in accordance with a predetermined sequence of inputs of the switch 32 by the user. Step S502 may be carried out by various techniques that may be applied separately or cumulatively. Under a first technique, readiness for each successive input to the switch 32 is indicated by (e.g., illumination, signaling, flashing or blinking) a light source 36. Under a second technique, readiness for each successive input to the switch 32 is indicated by the illumination of a light source 36 and the sounding of an audible indicator 34. Under a third technique, readiness for each successive input to the switch 32 is indicated by the illumination of a combination or permutation of one or more indicator light sources (36, 136, 236).

Under a fourth technique, under the predetermined sequence, a user or operator enters first point of a linear segment planned path for the vehicle (e.g., by pressing the switch 32 for the longer duration activation) after the light source 36 blinks (or flashes) once and while the vehicle is at the first point. The first point is associated with corresponding geographic coordinates (e.g., in two or three dimensions) at the time (e.g., first time) the switch 32 is pressed and released for a longer duration activation.

Under a fifth technique, under the predetermined sequence, a user or operator enters second point of a linear segment planned path for the vehicle (e.g., by pressing the switch 32 for the longer duration activation) after the light source 36 successively blinks (or flashes) twice and while the vehicle is at the second point. The second point is associated with corresponding geographic coordinates (e.g., in two or three dimensions) at the time (e.g., second time) the switch 32 is pressed and released for a longer duration activation.

Under a sixth technique, under the predetermined sequence, a user or operator enters a width between adjacent planned paths of the vehicle point of a linear path plan for the vehicle (e.g., by pressing the switch 32 for the longer duration activation) after the light source 36 successively blinks thrice and while the vehicle is at a width spaced apart between adjacent planned paths. The third point or width is associated with corresponding geographic coordinates (e.g., in two or three dimensions) at the time (e.g., third time) the switch 32 is pressed and released for a longer duration activation.

Under a seventh technique, under the predetermined sequence, a user or operator enters first point of a linear segment planned path for the vehicle (e.g., by pressing the switch 32 for the longer duration activation) after one of three indicator lights is lit (e.g., continuously or intermittently) and while the vehicle is at the first point.

Under an eighth technique, under the predetermined sequence, the user or operator enters second point of a linear segment planned path for the vehicle (e.g., by pressing the switch 32 for the longer duration activation) after two of three indicator lights is lit (e.g., continuously or intermittently) and while the vehicle is at the second point.

Under a ninth technique, under the predetermined sequence, the user or operator enters a width between adjacent planned paths of the vehicle point of a linear path plan for the vehicle (e.g., by pressing the switch 32 for the longer duration activation) after three indicator lights are lit (e.g., continuously or intermittently) and while the vehicle is at a width spaced apart between adjacent planned paths.

In step S504, the guidance module 27 or the electronic data processing system (46 or 146) manages a guidance mode for guiding a vehicle in accordance with the entered guidance program.

In step S506, an encoder 18 or sensor is adapted to sense or estimate a steering angle, a heading angle, a steering shaft 10 angle, a yaw angle of a steering system 121, a heading angle of the vehicle, or a steered wheel of the vehicle.

In step S508, a steering controller (20 or 120) can control the steering angle or the steering system (e.g., 121) in accordance with the guidance program if the electronic data processing system (46 or 146) or the data processor 24 is operating in a guidance mode. Step S508 may be carried out in accordance with various alternative techniques, which may be applied alternately or cumulatively. Under a first technique, consistent with FIG. 1A or FIG. 1B, the steering controller 20 or motor driver circuitry provides motor control commands to the motor 19 to turn a motor shaft 16, which in turn is mechanically coupled to the steering shaft 10 to rotate one or more steerable wheels or tracks of the vehicle to track a target path plan, such as substantially linear path of the vehicle between a first point and the second point.

Under a second technique, consistent with FIG. 1C the steering controller 120 receives data messages from the electronic data processing system 146 via the vehicle data bus 49 such as substantially linear path of the vehicle between a first point and the second point. In turn, the steering controller 120 is coupled to the steering system 121 and provides a control signal or control data to the steering system 121 for operating an electro-hydraulic valve or other electromechanical system for steering one or more wheels or tracks of the vehicle.

Under a third technique, an electric motor 19, coupled to a steering shaft 10 of the steering system 121, directs the vehicle in accordance with the guidance program or guidance module 27.

Figure 3:
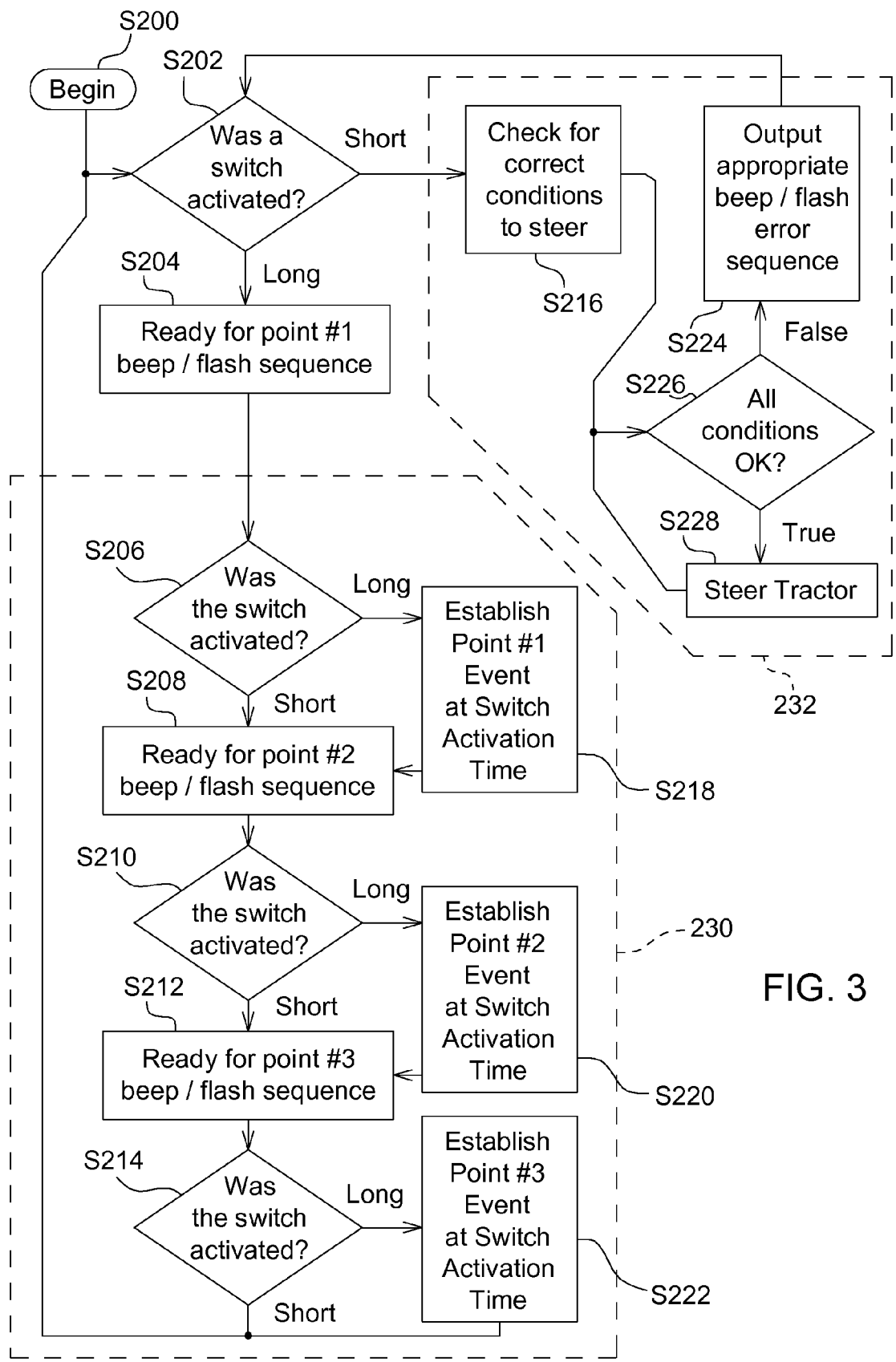
FIG. 3 is a flow chart of another embodiment of a method for controlling a vehicle.

FIG. 3 shows a method for controlling a vehicle in accordance with the system of FIG. 1A, 1B, or FIG. 1C, for instance. The method of FIG. 3 begins in step S200.

In step S202, the data processing system (46 or 146) determines whether or not a switch 32 was activated (e.g., pressed by a user). For example, the data processing system 46 or input interface 31 detects such switch activation as a shorter switch activation or a longer switch activation, labeled "short" or "long" respectively in FIG. 3. If the activation in step S202 is a shorter switch activation, the method continues with step S216. However, if the activation in step S202 is longer switch activation, the method continues with step S204.

In step S216, the data processing system (46 or 146) checks for the existence or presence of correct conditions to steer automatically the vehicle based on the guidance plan or guidance program via the steering controller (20 or 120). Steps S216, S224, S226, and S228 comprise a guidance mode 232 (20 or 120) or software instructions associated with a guidance module 27. Steps S216, S224, S226, and S228 are described in greater detail later in this document.

In step S204, the electronic data processing system (46 or 146) or the programming module 26 indicates that is ready for input via the switch 32 of a first guidance point based on an illumination (e.g., flash or flash sequence) of the light source 36, an audible alert from the audible indicator 34, or both.

In step S206, the data processing system (46 or 146) determines whether or not a switch 32 was activated (e.g., pressed by a user). For example, the data processing system (46 or 146) or input interface 31 detects such switch activation as a shorter switch activation or a longer switch activation, labeled "short" or "long" respectively in FIG. 3. If the activation in step S206 is a longer switch activation, the method continues with step S218. However, if the activation in step S206 is longer switch activation, the method continues with step S208.

In step S218, the data processing system (46 or 146) or the programming module 26 establishes a first point event, which records a first guidance point and its associated geographical coordinates at a switch activation time (e.g., first time). The first guidance point represents one of two or more guidance points that lie on generally linear segment or path segment for automated guidance of the vehicle in a guidance mode.

In step S208 the electronic data processing system (46 or 146) or the programming module 26 indicates that is ready for a second guidance point based on an illumination (e.g., flash or flash sequence) of the light source 36, an audible alert from the audible indicator 34, or both.

In step S210, the data processing system 46 determines whether or not a switch 32 was activated (e.g., pressed by a user). For example, the data processing system 46 or input interface 31 detects such switch activation as a shorter switch activation or a longer switch activation, labeled "short" or "long" respectively in FIG. 3. If the activation in step S210 is a longer switch activation, the method continues with step S220. However, if the activation in step S210 is shorter switch activation, the method continues with step S212.

In step S220, the data processing system (46 or 146) or the programming module 26 establishes a second point event, which records a second guidance point and its associated geographical coordinates at a second switch activation time (e.g., second switch). The second guidance point represents one of two or more guidance points that lie on generally linear segment or path segment for automated guidance of the vehicle in a guidance mode.

In step S212, the electronic data processing system (46 or 146) or the programming module 26 indicates that it is ready for a third guidance point based on an illumination (e.g., flash or flash sequence) of the light source 36, an audible alert from the audible indicator 34, or both.

In step S214, the data processing system 46 determines whether or not a switch 32 was activated (e.g., pressed by a user). For example, the data processing system 46 or input interface 31 detects such switch 32 activation as a shorter switch activation or a longer switch activation, labeled "short" or "long" respectively in FIG. 3. If the activation in step S214 is a longer switch activation, the method continues with step S222. However, if the activation in step S210 is shorter switch activation, the method returns to step S200.

In step S222, the data processing system (46 or 146) or the programming module 26 establishes a third point event, which records a third guidance point and its associated geographical coordinates at the third switch activation time (e.g., third time). The third guidance point represents width or row width of adjacent passes or paths of the vehicle.

In an alternate embodiment, the third guidance point represents one of two or more guidance points that lie on generally curved segment, contour or curved path segment for automated guidance of the vehicle in a guidance mode. Collectively, steps S206, S218, S208, S210, S220, S212, S214, S222 may comprise software instructions in a programming module 26, for example.

Steps S216, S224, S226, and S228 comprise software instructions for a guidance mode associated with a guidance module 27. In step S216, the data processing system (46 or 146) checks for the existence or presence of correct conditions to steer. After step S216, the method continues with step S226. In step S226, the guidance module 27, mode controller 29, or electronic data processing system (46 or 146) determines whether or not all conditions are okay or acceptable for automated guidance or steering of the vehicle by the electronic data processing system (46 or 146) and its steering controller (20 or 120). If all conditions are okay or acceptable (e.g., where a "true" state exists as shown in FIG. 3), the method continues with step S228. However, if all conditions are not okay or acceptable (e.g., where a "false" state exists as shown in FIG. 3), the method continues with step S224.

In step S228, the electronic data processing system (46 or 146) or the steering controller (20 or 120) steers the vehicle or provides commands to the steering system (e.g., 121) or the electric motor 19 to steer the vehicle in accordance with an established guidance program to track from a first point to a second point along a first generally linear path and to begin a second generally linear path that is generally parallel to the first path and separated from the first path by a width associated with a third point entered into the data processing system (46 or 146) via the switch 32.

In step S224, the electronic data processing system (46 or 146) or the drivers (47 or 147) cause the audible indicator 34, the light source 36, or both to indicate an error state or diagnostic code. For example, the light source 36 may flash a certain sequence of illuminations of one or more light source 36s to indicate an error, problem, or diagnostic code with the automated guidance.

Figure 4A:
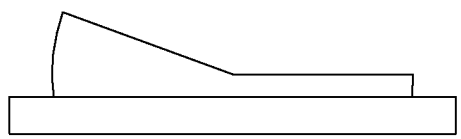
FIG. 4A illustrates a first position of an illustrative switch that may be used to practice the system or method.
Figure 4B:
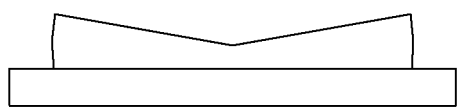
FIG. 4B illustrates a second position of an illustrative switch that may be used to practice the system or method of this disclosure.
Figure 4C:
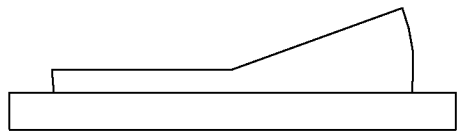
FIG. 4C illustrates a third position of an illustrative switch that may be used to practice the system or method of this disclosure.

FIG. 4A through FIG. 4C, inclusive, indicate various switch positions and corresponding switch states of an illustrative switch 32 that may be used in any embodiment of the system. In FIG. 4A, a first position of the switch 32 is pressed inward toward a lower position in which a motor 19 (e.g., steering) is disabled or not energized. If the switch 32 is in the first position, the vehicle can be shipped without disconnecting a battery source or other energy source that might otherwise be required in certain jurisdictions because of regulations or laws, for example. FIG. 4B shows a second position or neutral position of the switch 32 in which the electronic data processing system (46 or 146) and the motor 19 are energized or actively operating. FIG. 4C shows a third position or momentary activation that occurs if and when a user presses the switch 32 to overcome the bias spring, resilient member or associated bias force during a shorter activation or a longer activation. If a user stops pressing the switch 32 or presses with less force than required to overcome the bias spring, resilient member or associated bias force, the switch 32 turns to its rest state or the neutral position of FIG. 4B.

Figure 5:
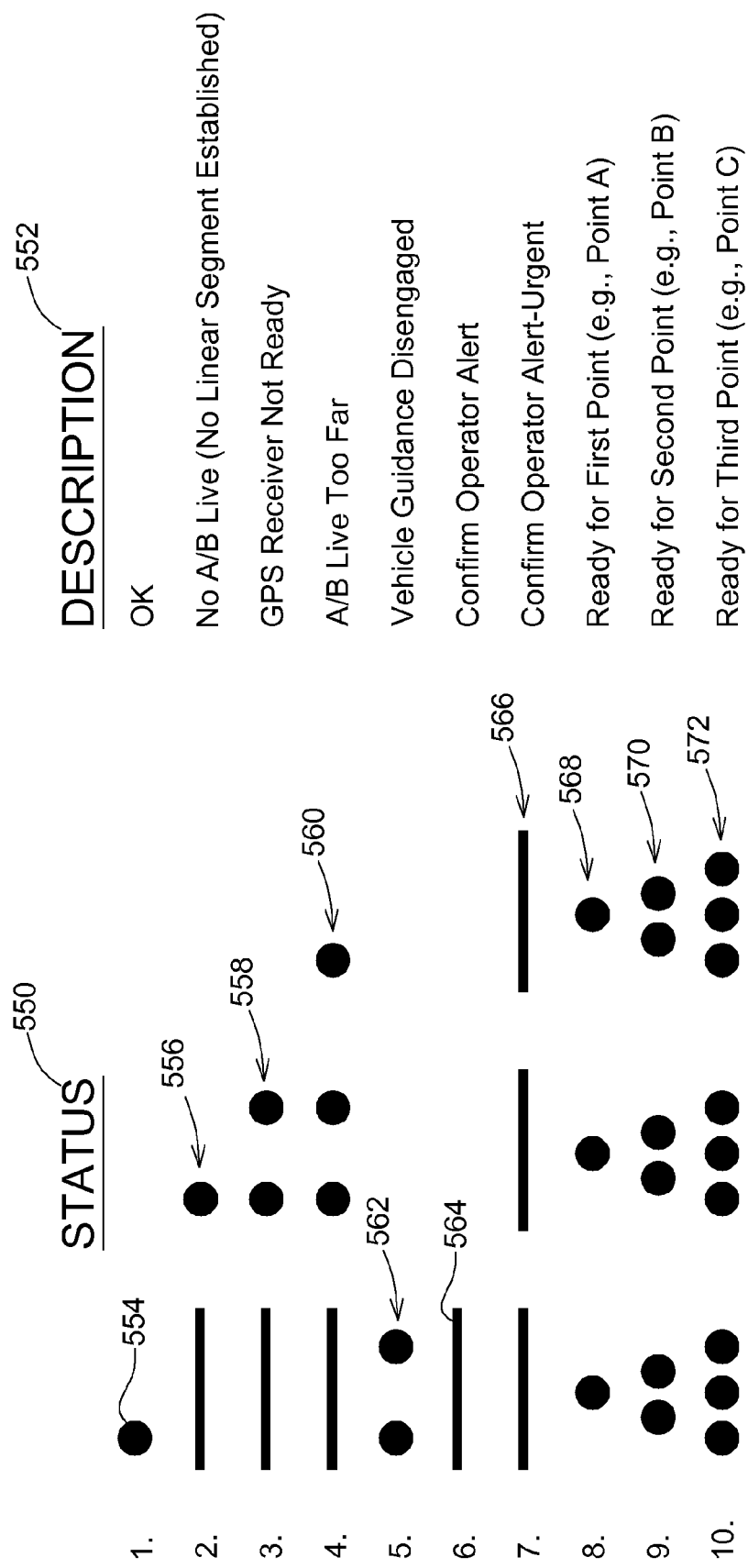
FIG. 5 provides chart of corresponding statuses and respective descriptions for activation of one or more light sources of the system.

FIG. 5 provides chart of corresponding status and descriptions for activation of one or more light sources (36, 136 or 236) of the system. The chart is divided into two columns: status column 550 and description column 552.

In the first row of FIG. 5, a short activation 554 of the light source 36 indicates that that electronic data processing system (46 or 146) is okay and active. In the second row, a sequence 556 of a long activation followed by a short activation of the light source 36 indicates that no linear segment, for the planned path of the vehicle, was established, or the no first/second points (e.g., A/B points) are live. In the third row, a sequence 558 of a long activation followed by two short activations of the light source 36 indicate that the location determining receiver 30 (e.g., GPS) is not ready or locked onto a position (e.g., differentially calculated position based on the carrier phase measurements from three or more satellites received at the location determining receiver 30). In the fourth row, a sequence 560 of the long activation followed by three short activations of the light source 36 indicates that the linear segment is too long or first point/second live points (e.g., A/B live points) live are too far apart from each other. In the fifth row, a sequence 562 of two short activations of the light source 36 indicates that automated guidance by the location determining receiver 30 is disengaged or inactive. In the sixth line, the single long activation 564 of the light source 36 indicates an operator alert or indicates for the operator to confirm an operator alert by making an entry. In the seventh line, the sequence 566 of three long activations of the light source 36 indicates an operator alert or for the operator to confirm an operator alert by making an entry. In the eighth line, the sequence 568 of three short activations of the light source 36 indicates that the data processing system 46 or the programming module 26 is ready for the operator to enter the first point or "A" point, by moving the vehicle to the geographic coordinates to be associated with the first point and activating the switch 32 (e.g., with a longer switch activation). In the ninth line, the sequence 570 of three double short activations indicates that the data processing system 46 or the programming module 26 is ready for the operator to enter the second point or B point, by moving the vehicle to the geographic coordinates to be associated with the second point and activating the switch 32 (e.g., with a longer switch activation). In the tenth line, the sequence 572 of three triple short activations indicate that the data processing system 46 or the programming module 26 is ready for the operator to enter the row with or a third point, by moving the vehicle to the geographic coordinates to be associated with the third point and activating the switch 32 (e.g., with a longer switch activation).

In an alternate embodiment, one or more of the above activations of the light sources (36, 136 or 236) may be carried out simultaneously on multiple light sources. For example, in the eighth line, the ready-for-entry indication for the first point (e.g., A point) may appear as a single long activation or continuously illumination of a first light source 36, while the second light source 136 and the third light source 236 are inactive. Similarly, in the ninth line the ready-for-entry indication for the second point (e.g., B point) may appear as a dual long activations, or continuous illuminations, simultaneously of each of the first light source 36 and the second light source 136, while the third light source 236 is inactive. Finally, in the tenth line ready for width entry or the third point indication may appear as a triple activation, or continuous illuminations, simultaneously on each of the first light source 36, the second light source 136 and the third light source 236. Meanwhile, the activations in the first line through the seventh line can be carried out solely by the first light source 36, or in accordance with other codes or sequences that are programmed by the user, factory programmed, or otherwise used by convention, standard, or default.

In an alternate embodiment, one or more drivers may drive a numeric display (e.g., segmented numeric display), or an alpha-numeric display to display status codes to a user, rather than the light patterns, sequences or flashes set forth in FIG. 5.

The above system and method is well-suited for programming and controlling the guidance of the vehicle without any display. Accordingly, the system and method can reduce the cost of the data processing system by elimination of any robust liquid crystal display that is configured to withstand harsh environmental conditions (e.g., range of temperature fluctuation from negative 40 degrees Celsius to positive 40 degrees Celsius), to reduce glare for an operator, or to withstand an outdoor environment (e.g. rain, snow, ice precipitation) without an operator cab, for example. The above method and system can be programmed and executed by the operator by using a single switch and one or more light sources without any display and by making entries solely by activating a single switch or push button switch for momentary contact in a combination of longer activations or shorter activations. In one embodiment, the operator receives feedback on his or her entries via one or more light sources, and or audible indicators. Accordingly, the method and system can be installed on heavy equipment, agricultural equipment or vehicles, construction equipment or vehicles, with or without an operator cab, even where the vehicles or equipment are exposed to the elements or outdoor environment.

Any of the independent claims may be combined with one or more features of any dependent claim, and such combinations of claims and claim elements are hereby incorporated by reference into this specification.

Having described the preferred embodiment, it will become apparent that various modifications can be made without departing from the scope of the invention as defined in the accompanying claims.

The following is claimed:

1. A system for controlling a vehicle, the system comprising:
  a switch;
  a mode controller for entering a programming mode or a guidance mode based on user input to the switch;
  a programming module for managing a programming mode in which the user enters a guidance program in accordance with a predetermined sequence of inputs of the switch by the user, where readiness for each successive input to the switch is indicated by a light source;
  a guidance module for managing a guidance mode for guiding a vehicle in accordance with the entered guidance program;
  a data processor executing software instructions associated with the mode controller, the programming module, and the guidance module;
  a data storage device for storing the software instructions;
  a steering system associated with one or more wheels or tracks of the vehicle;
  an encoder for sensing a steering angle of a steering system;
  a steering controller associated with the steering system for controlling the steering angle in accordance with the guidance program if the system or the data processor is operating in a guidance mode; and
  a detector for identifying a longer duration activation versus a shorter duration activation of the switch, wherein an initial entry determines the operational mode.

2. The system according to claim 1 wherein a user presses the switch for the longer duration to enter into the programming mode.

3. The system according to claim 1 wherein the predetermined sequence comprises a user entering first point of a linear segment planned path for the vehicle [after the light source blinks once and while the vehicle is at the first point.

4. The system according to claim 1 wherein the predetermined sequence comprises a user entering second point of a linear segment planned path for the vehicle after the light source successively blinks twice and while the vehicle is at the second point.

5. The system according to claim 1 wherein the predetermined sequence comprises a user entering a width between adjacent planned paths of the vehicle point of a linear path plan for the vehicle after the light source successively blinks thrice and while the vehicle is at a width spaced apart between adjacent planned paths.

6. The system according to claim 1 further comprising:
  an electric motor coupled to a steering shaft of the steering system for directing the vehicle.

7. The system according to claim 1 further comprising:
  a plurality of light sources;
  a driver coupled to the light sources and a data port associated with the data processor.

8. The system according to claim 7 wherein the predetermined sequence comprises a user entering first point of a linear segment planned path for the vehicle after one of three indicator lights is lit and while the vehicle is at the first point.

9. The system according to claim 7 wherein the predetermined sequence comprises a user entering second point of a linear segment planned path for the vehicle after two of three indicator lights is lit and while the vehicle is at the second point.

10. The system according to claim 7 wherein the predetermined sequence comprises a user entering a width between adjacent planned paths of the vehicle point of a linear path plan for the vehicle after three indicator lights are lit and while the vehicle is at a width spaced apart between adjacent planned paths.

11. A method for controlling a vehicle, the method comprising:
   entering a programming mode or a guidance mode based on user input to a switch;
   managing a programming mode in which the user enters a guidance program in accordance with a predetermined sequence of inputs of the switch by the user, where readiness for each successive input to the switch is indicated by a light source;
   managing a guidance mode for guiding a vehicle in accordance with the entered guidance program;
   sensing a steering angle of a steering system;
   controlling the steering angle in accordance with the guidance program if the system or the data processor is operating in a guidance mode; and
   identifying a longer duration activation versus a shorter duration activation of the switch, wherein an initial entry determines the operational mode.

12. The method according to claim 11 wherein a user presses the switch for the longer duration to enter into the programming mode.

13. The method according to claim 11 further comprising:
   under the predetermined sequence, entering first point of a linear segment planned path for the vehicle after the light source blinks once and while the vehicle is at the first point.

14. The method according to claim 11 further comprising:
   under the predetermined sequence, entering second point of a linear segment planned path for the vehicle after the light source successively blinks twice and while the vehicle is at the second point.

15. The method according to claim 11 further comprising:
   under the predetermined sequence, entering a width between adjacent planned paths of the vehicle point of a linear path plan for the vehicle after the light source successively blinks thrice and while the vehicle is at a width spaced apart between adjacent planned paths.

16. The method according to claim 11 further comprising:
   directing the vehicle by an electric motor coupled to a steering shaft of the steering system.

17. The method according to claim 11 further comprising:
   under the predetermined sequence, entering first point of a linear segment planned path for the vehicle after one of three indicator lights is lit and while the vehicle is at the first point.

18. The method according to claim 11 further comprising:
   under the predetermined sequence, entering second point of a linear segment planned path for the vehicle after two of three indicator lights is lit and while the vehicle is at the second point.

19. The method according to claim 11 further comprising:
   under the predetermined sequence, entering a width between adjacent planned paths of the vehicle point of a linear path plan for the vehicle after three indicator lights are lit and while the vehicle is at a width spaced apart between adjacent planned paths.

* * * * *